(12) United States Patent
Ankenman et al.

(10) Patent No.: US 10,834,862 B2
(45) Date of Patent: Nov. 17, 2020

(54) DISC LEVELING SYSTEM

(71) Applicant: KUHN KRAUSE, INC., Hutchinson, KS (US)

(72) Inventors: Tom W. Ankenman, Hutchinson, KS (US); Rodney L. Hagman, Buhler, KS (US)

(73) Assignee: KUHN KRAUSE, INC., Hutchinson, KS (US)

( * ) Notice: Subject to any disclaimer, the term of this patent is extended or adjusted under 35 U.S.C. 154(b) by 249 days.

(21) Appl. No.: 15/934,464

(22) Filed: Mar. 23, 2018

(65) Prior Publication Data

US 2019/0059197 A1 Feb. 28, 2019

Related U.S. Application Data

(60) Provisional application No. 62/549,249, filed on Aug. 23, 2017.

(51) Int. Cl.
| | |
|---|---|
| *A01B 49/02* | (2006.01) |
| *A01B 21/08* | (2006.01) |
| *A01B 29/04* | (2006.01) |
| *A01B 5/08* | (2006.01) |
| *A01B 23/04* | (2006.01) |

(52) U.S. Cl.
CPC .............. *A01B 49/027* (2013.01); *A01B 5/08* (2013.01); *A01B 21/086* (2013.01); *A01B 29/048* (2013.01); *A01B 23/046* (2013.01)

(58) Field of Classification Search
CPC .... A01B 5/04; A01B 5/16; A01B 5/08; A01B 21/08; A01B 21/083; A01B 21/086; A01B 49/027

See application file for complete search history.

(56) References Cited

U.S. PATENT DOCUMENTS

| | | | | |
|---|---|---|---|---|
| 338,176 | A * | 3/1886 | La Dow | A01B 49/027 172/142 |
| 881,566 | A * | 3/1908 | Everingham | A01B 49/027 172/142 |
| 892,340 | A * | 6/1908 | Watson | A01B 49/027 172/151 |
| 1,894,474 | A * | 1/1933 | Sckowska | A01B 21/08 172/567 |
| 2,538,594 | A * | 1/1951 | Rutter | A01B 21/08 172/141 |
| 2,546,554 | A * | 3/1951 | McElroy | A01B 5/08 172/212 |

(Continued)

FOREIGN PATENT DOCUMENTS

| | | |
|---|---|---|
| CN | 204578983 | 8/2015 |
| FR | 1100370 | 4/1955 |

*Primary Examiner* — Jessica H Lutz
(74) *Attorney, Agent, or Firm* — Oblon, McClelland, Maier & Neustadt, L.L.P.

(57) ABSTRACT

A disc conditioner to work soil in a forward direction including a main support structure, a secondary support structure that protrudes from the main support structure in the forward direction, a main disc assembly affixed to the main support structure, and a secondary disc assembly that is affixed to the secondary support structure and protrudes from the main disc assembly in the forward direction. The secondary disc assembly generates an oscillating soil and residue flow along a central axis of the disc conditioner that levels the soil.

18 Claims, 9 Drawing Sheets

(56) References Cited

U.S. PATENT DOCUMENTS

| | | | | |
|---|---|---|---|---|
| 3,845,825 | A * | 11/1974 | Boone | A01B 21/08 |
| | | | | 172/158 |
| 4,245,706 | A * | 1/1981 | Dietrich, Sr. | A01B 49/02 |
| | | | | 172/180 |
| 4,423,789 | A | 1/1984 | Anderson et al. | |
| 4,542,793 | A * | 9/1985 | Dietrich, Sr. | A01B 49/02 |
| | | | | 172/180 |
| 7,017,675 | B2 | 3/2006 | Ankenman et al. | |
| 9,723,776 | B2 * | 8/2017 | Sporrer | A01B 63/32 |
| 2013/0299204 | A1 * | 11/2013 | Achten | A01B 49/027 |
| | | | | 172/178 |
| 2014/0262363 | A1 * | 9/2014 | Gray | A01B 21/083 |
| | | | | 172/1 |
| 2015/0373897 | A1 * | 12/2015 | Larsen | A01B 21/086 |
| | | | | 172/175 |
| 2018/0199497 | A1 * | 7/2018 | Roberge | A01B 49/027 |
| 2019/0380251 | A1 * | 12/2019 | Becker | A01B 21/083 |

* cited by examiner

DISC LEVELING SYSTEM

CROSS-REFERENCE TO RELATED APPLICATIONS

This application claims priority to U.S. Provisional Application No. 62/549,249 filed on Aug. 23, 2017, which is incorporated by reference in its entirety.

BACKGROUND

Field of the Disclosure

The present disclosure relates to a ground engagement or soil tillage tool. More precisely, the present application relates to a disc conditioner.

Description of the Related Art

In today's agriculture, due to the use of heavy machinery, e.g., tractors, trucks, and/or agricultural tools, and/or plant cultivation, a compaction layer that restricts plant germination and growth may be formed beneath the soil surface.

In order to plant and grow a new crop, the compaction layer should be reduced. Such a demand in reducing soil compaction can be addressed by shattering and/or breaking down the compaction layer.

To this end, conventional soil preparation tools that can work the soil, e.g., plow and/or lift the soil, to shatter the compaction layer and/or break down residues, e.g., soil agglomeration, root balls, or the like, have been employed.

To further work and refine the soil, these conventional soil preparation tools can rely on a plurality of discs and/or blades arranged in different configurations, e.g., multiple row arrangement, and/or inverse tandem, that generates sinusoidal soil flow lines when the plurality of discs is displaced through the soil surface, as illustrated in FIG. 1.

Although such conventional soil preparation tools are widely used, they present important drawbacks. Notably, these conventional soil preparation tools can cause streaking of residue, over flows of soil and leave an uneven field finish.

Thus, a soil preparation tool solving the aforementioned problems of unevenness and residue streaking is needed.

SUMMARY

Accordingly, the object of the present disclosure is to provide a disc conditioner which overcomes the above-mentioned limitations of soil finishing.

In one non-limiting illustrative example, a disc conditioner to work soil in a forward direction is presented. The disc conditioner includes a main support structure, a secondary support structure that protrudes from the main support structure in the forward direction, a main disc assembly affixed to the main support structure, and a secondary disc assembly that is affixed to the secondary support structure and protrudes from the main disc assembly in the forward direction, wherein the secondary disc assembly generates an oscillating soil and residue flow along a central axis of the disc conditioner that levels the soil.

In another non-limiting illustrative example, a disc conditioner to work soil in a forward direction is presented. The disc conditioner includes a main support structure having a main front member, and a main back member positioned backwardly from the main front member and substantially parallel to the main front member, a secondary support structure that protrudes forwardly from the main front member, the secondary support structure having a secondary central support member that is positioned substantially centrally and perpendicular to the main front member, a secondary front member positioned forwardly from the main front member, and a secondary back member positioned between the main front member and the main back member, a main disc assembly that is affixed to the main front member and the main back member, and a secondary disc assembly that is affixed to the secondary front member and the secondary back member, wherein the secondary disc assembly generates an oscillating flow of soil and residue along a central axis of the disc conditioner that levels the soil.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
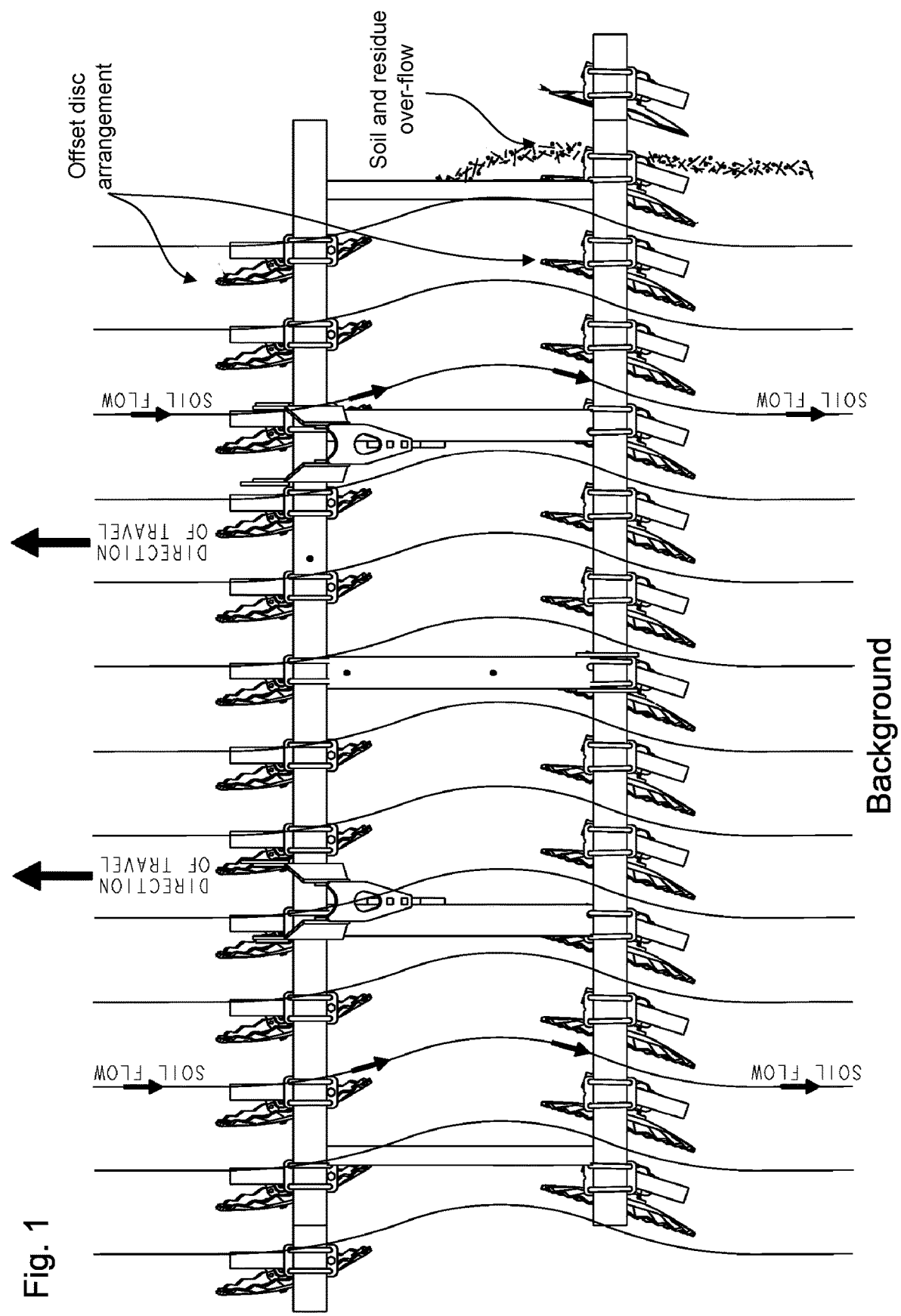
FIG. 1 is a top view of a conventional disc conditioner.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a," "an," and the like include a meaning of "one or more," unless stated otherwise. The drawings are generally drawn not to scale unless specified otherwise or illustrating schematic structures or flowcharts.

Figure 2A:
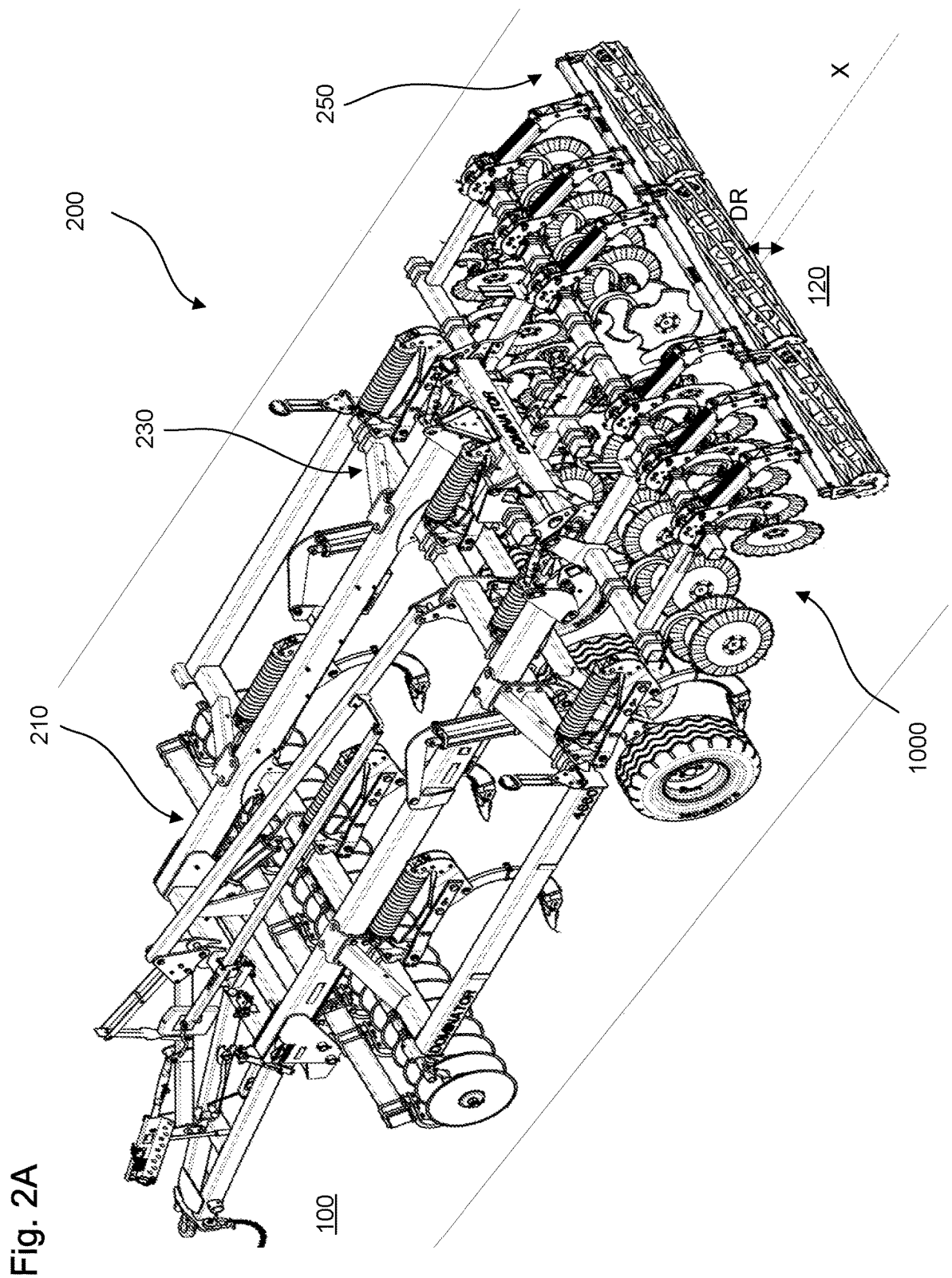
FIG. 2A is a perspective view of a tillage tool assembly, according to certain aspects of the disclosure.
Figure 2B:
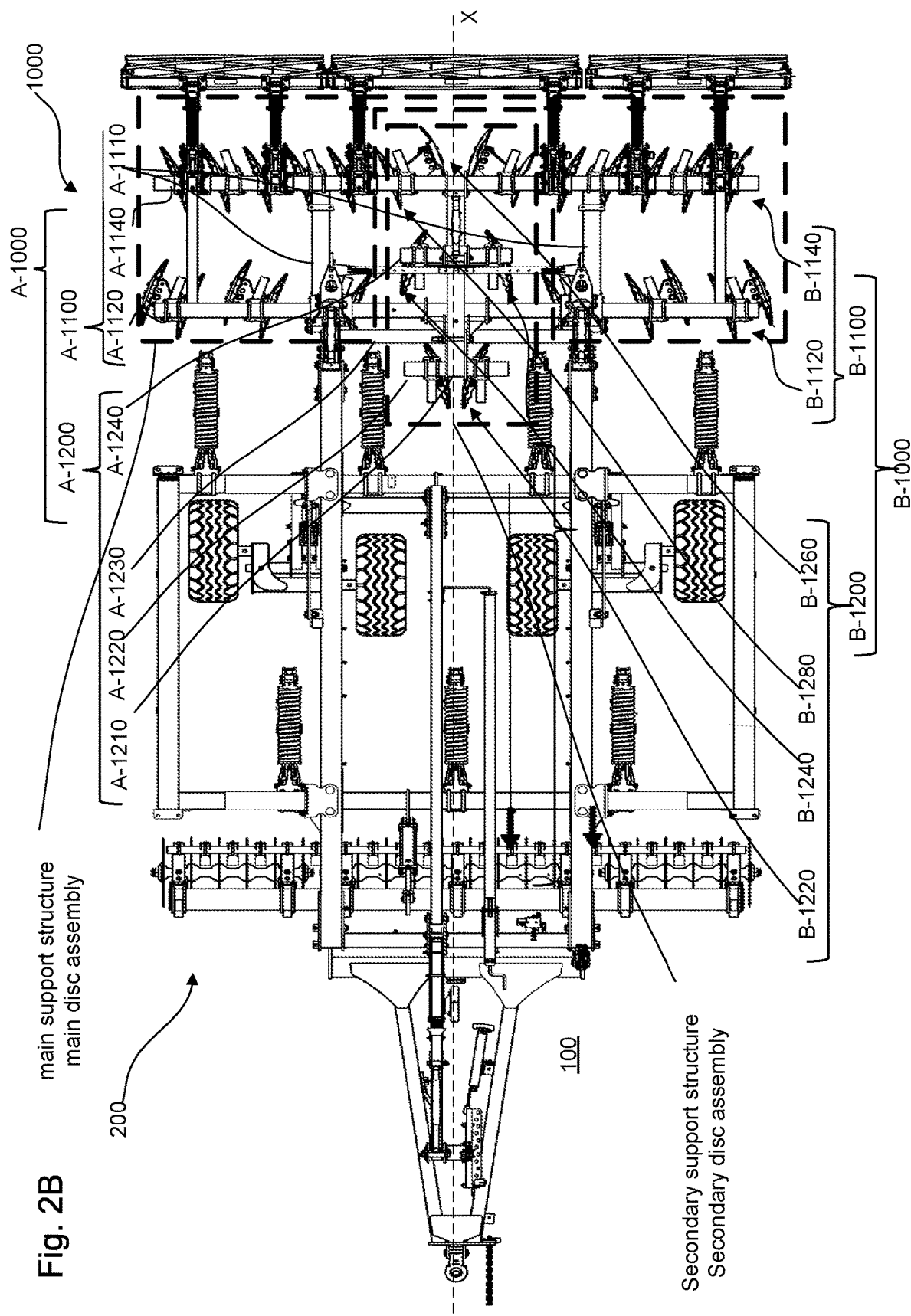
FIG. 2B is a top view of the tillage tool, according to certain aspects of the disclosure.
Figure 2C:
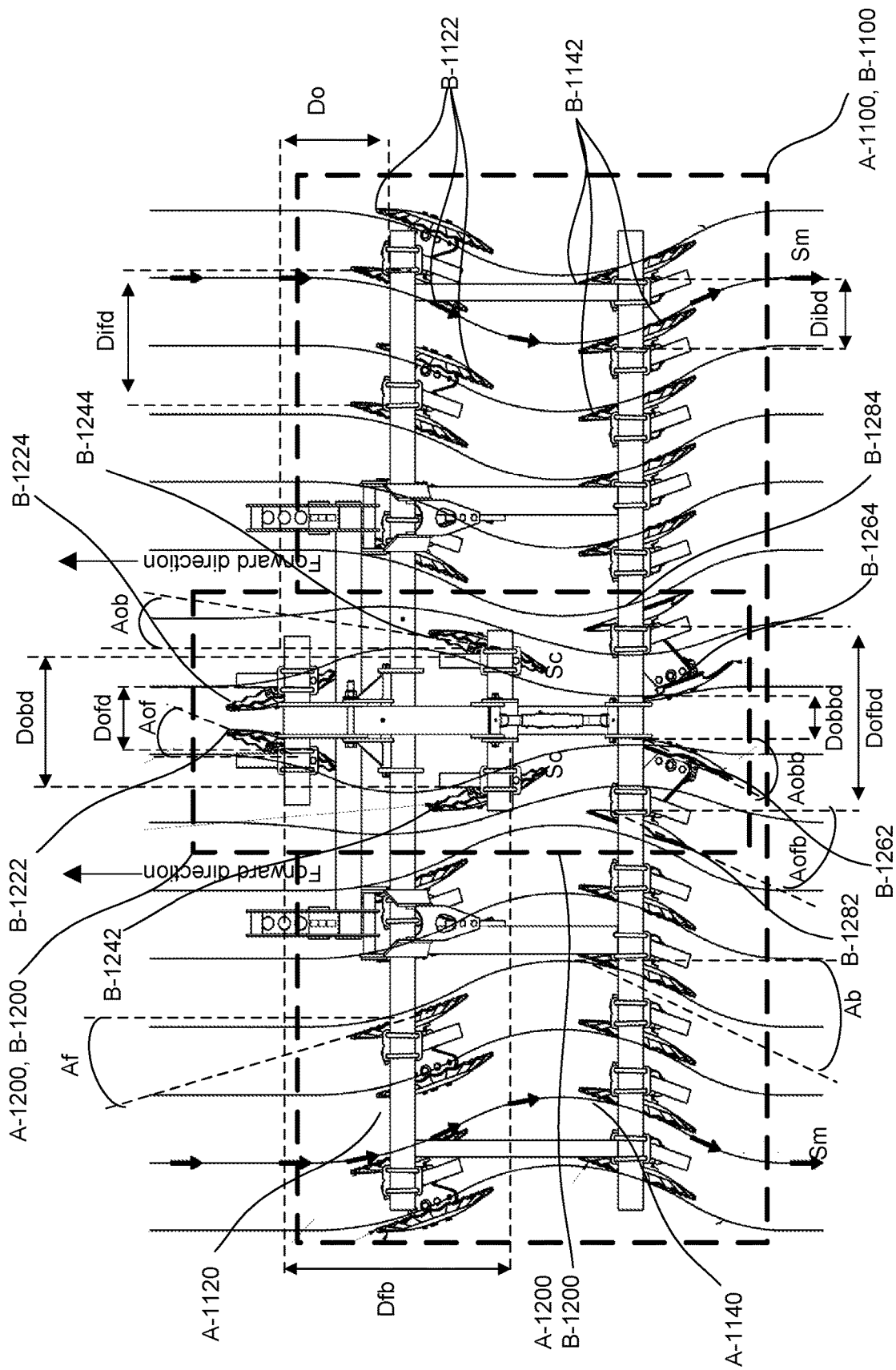
FIG. 2C is a top focus view of a disc conditioner of the tillage tool, according to certain aspects of the disclosure.

FIGS. 2A-2C are a perspective view, a top view, and a top focus view of a tillage tool assembly 200 with a disc conditioner 1000, according to certain aspects of the disclosure.

The tillage tool assembly 200 can include a front support member 210 that connects to a tractor, a back support member 230 opposite to the front support member 210 to support a disc conditioner 1000, and a leveling wheel 250 that is supported by the disc conditioner 1000.

The tillage tool assembly 200 goes over materials 100, e.g., soil that has been compacted due heavy machinery wheel traffic and/or soil containing root residues due to previously cultivation, to produce prepared materials 120, e.g., soil that has been shattered, loosened, and/or aerated to be used as a seed bed.

As used herein, the terms "front" and/or "forward" refer to the region of the tillage tool assembly 200 closest to the front support member 210, and the terms "back" and/or "backward" refer to the region of the tillage tool assembly 200 closest to the leveling wheel 250.

The tillage tool assembly 200 can include a disc conditioner 1000 that works and cuts the materials 100 to smooth, level, and reduce residues, e.g., accumulation of soil, and/or leftover of vegetation.

The disc conditioner 1000 can include a support structure assembly A-1000 and a disc assembly B-1000 affixed to the support structure assembly A-1000 and in contact with the materials 100.

The support structure assembly A-1000 can include a main support structure A-1100, a secondary support structure A-1200 positioned along a center line X of the tillage tool assembly 200 and forwardly from the main support structure A-1100 by a predetermined distance Do, while the disc assembly B-1000 can include a main disc assembly B-1100 supported by the main support structure A-1100 and a secondary disc assembly B-1200 supported by the secondary support structure A-1200 and positioned along the center line X and forwardly from the main disc assembly B-1100 by the predetermined distance Do.

The secondary disc assembly B-1200 and the main disc assembly B-1100 efficiently level the materials 100 that have been worked and made uneven, e.g., presence of ridges and/or ditches, through different tillage tools, e.g., points and/or shanks.

The secondary disc assembly B-1200 and the main disc assembly B-1100 efficiently level the materials 100 by generating an oscillating flow of the materials 100 that fills the ditches and/or remove the ridges that may be present in the materials 100. The oscillating flow can correspond to central stream lines Sc, generated by the secondary disc assembly B-1200, that are offset from main stream lines Sm, generated by the main disc assembly B-1100, as illustrated in FIG. 2C.

In addition, the secondary disc assembly B-1200 eliminates and/or minimizes the tendency to have accumulation and/or formation of residues.

The reduction of the residues and leveling of the materials 100 provided by the disc conditioner 1000 can reduce time and energy consumption by eliminating an additional preparation and/or work, e.g., an additional tillage operation to further level the materials 100, e.g., field.

The main support structure A-1100 can include a main front member A-1120 that extends transversally from the center line X, a main back member A-1140 that extends transversally from the center line X, and main lateral members A-1110 that extend between the main back member A-1140 and the main front member A-1120 and positioned on each side of the secondary support structure A-1200.

The main disc assembly B-1100 can include a main front disc assembly B-1120 supported by the main front member A-1120 and a main back disc assembly B-1140 supported by the main back member A-1140. The main front disc assembly B-1120 and the main back disc assembly B-1140 are spaced apart by the main lateral members A-1110.

The main front disc assembly B-1120 can push and/or direct the materials 100 towards the center line X while the main back disc assembly B-1140 can receive the materials 100 from the main front disc assembly B-1120 and push and/or direct the materials 100 away from the center line X.

In addition, the main front disc assembly B-1120 and the main back disc assembly B-1140 are laterally offset from each other to have the materials 100 flowing through the main front disc assembly B-1120 and the main back disc assembly B-1140 in an oscillating pattern.

As shown in FIG. 2C, the main front disc assembly B-1120 can include a plurality of main front discs B-1122 positioned substantially equidistantly from each other with an inter front disc distance Difd and oriented with a front angle Af to directs the materials 100 towards the center line X.

As shown in FIG. 2C, the main back disc assembly B-1140 can include a plurality of main back discs B-1142 positioned substantially equidistantly from each other with an inter back disc distance Dibd and oriented with a back angle Ab to directs the materials 100 away from the center line X.

The inter front disc distance Difd, the inter back disc distance Dibd, the front angle Af, and the back angle Ab can be determined based on physical properties of the materials 100, e.g., viscosity levels, humidity levels, soil types, type of vegetation cultivated, to efficiently eliminate the residues and level the materials 100.

For example, the front disc distance Difd can be between 100 mm and 500 mm, and preferably between 200 mm and 400 mm, the back disc distance Dibd can be between 100 mm and 500 mm, and preferably between 200 mm and 400 mm, the front angle Af can be between 0° and 45°, and preferably between 10° and 30°, and the back angle Ab can be between 0° and 45°, and preferably between 10° and 30°.

The secondary support structure A-1200 can include a secondary front support member A-1220 positioned substantially parallel to the main front member A-1120 and forward from the main front member A-1120, a secondary back support member A-1240 positioned substantially parallel to the main front member A-1120 at a predetermined distance Dfb from the secondary front support member A-1220, a secondary lateral support member A-1230 extending transversally across the central axis X and positioned between the main front member A-1120 and the secondary front support member A-1220, and a secondary central support member A-1210 extending from the secondary front support member A-1220 to the main back member A-1140 to provide structure for the secondary front support member A-1220, the secondary lateral support member A-1230, and the secondary back support member A-1240.

The secondary disc assembly B-1200 can include a secondary front disc pair B-1220 supported by the secondary front support member A-1220, a secondary back disc pair B-1240 supported by the secondary back support member A-1240, a secondary front blade pair B-1280 positioned backwardly from the secondary back disc pair B-1240 and supported by the main back member A-1140, and a secondary back blade pair B-1260 positioned backwardly from the secondary lateral support member A-1230 and supported by the main back member A-1140.

The secondary front disc pair B-1220 can contact the materials 100 before the main front disc assembly B-1120 and push and/or direct the materials 100 away from the center line X and towards the main front disc assembly B-1120 while the secondary back disc pair B-1240 can push and/or direct the materials 100 towards the secondary back blade pair B-1260.

The secondary front blade pair B-1280 and the secondary back blade pair B-1260 can receive the materials 100 from the secondary back disc pair B-1240 and the front disc assembly B-1120, and redirect the materials away from the central axis X to generate on the materials 100 an oscillating flow extending between the main front disc assembly B-1120 and the main back disc assembly B-1140 that reduces residues and levels the materials 100.

The secondary front disc pair B-1220 can include a first secondary front disc B-1222 and a second secondary front disc B-1224 spaced by a secondary front disc distance Dofd and oriented to form an offset front angle Aof that directs the materials 100 away from the center line X and towards the secondary back disc pair B-1240.

The secondary back disc pair B-1240 can include a first secondary back disc B-1242 and a second secondary back disc B-1244 spaced apart by an offset back disc distance Dobd longer than the secondary front disc distance Dofd and oriented to form an offset back angle Aob that directs the materials 100 towards the center line X and the secondary back blade pair B-1260.

The secondary front blade pair B-1280 can include a first front blade B-1282 and a second front blade B-1284 spaced apart by a secondary front blade distance Dofbd, and oriented to form a secondary front blade angle Aofb that directs the materials 100 substantially parallel to the center line X, as illustrated in FIG. 2C.

The secondary back blade pair B-1260 can include a first back blade B-1262 and a second back blade B-1264 spaced apart by a secondary back blade distance Dobbd, raised from the secondary front blade pair B-1280 by a raise distance Dr, and oriented to form a secondary back blade angle Aobb that directs the materials 100 substantially parallel to the center line X, as illustrated in FIG. 2C.

The secondary front disc distance Dofd, the secondary front angle Aof, the secondary back disc distance Dobd, the secondary back angle Aob, the secondary front blade distance Dofbd, the secondary front blade angle Aofb, the secondary back blade pair distance Dobbd, the raise distance Dr, and the secondary back blade angle Aobb can be determined based on the physical properties of the materials 100 to reduce residues and level the materials 100.

For example, the secondary front disc pair distance Dofd can be between 0 mm and 500 mm, and preferably between 100 mm and 400 mm, the secondary back disc pair distance Dobd can be between 0 mm and 1000 mm, and preferably between 200 mm and 800 mm, the secondary front blade pair distance Dofbd can be between 0 mm and 2000 mm, and preferably between 400 mm and 1500 mm, the secondary back blade pair distance Dobbd can be between 0 mm and 500 mm, and preferably between 100 mm and 400 mm, the raise distance Dr can be between 0 mm and 500 mm, and preferably between 100 mm and 400 mm, the secondary front angle Aof can be between 0° and 45°, and preferably between 10° and 30°, the secondary back blade pair angle Aob can be between 0° and 45°, and preferably between 10° and 30°, the secondary front blade pair angle Aofb can be between 0° and 45°, and preferably between 10° and 30°, and the secondary back blade pair angle Aobb can be between 0° and 45°, and preferably between 10° and 45°.

In addition, the discs of the secondary disc assembly B-1200 can have different configurations and/or arrangements dependent on the physical properties of the materials 100, and/or if the disc conditioner 1000 is used as an attachment tool in addition to other tillage tools, as illustrated in FIGS. 2A-2C, or as an independent tool, as illustrated in FIGS. 4A-4C.

For example, the discs of the front disc assembly B-1120 can be arranged two-by-two along the main front member A-1120 while the discs of the main back disc assembly B-1140 can be arranged one-by-one along the main back member A-1140 when the disc conditioner 1000 is used as an attachment, as illustrated in FIGS. 2A-2B.

Figure 5A:
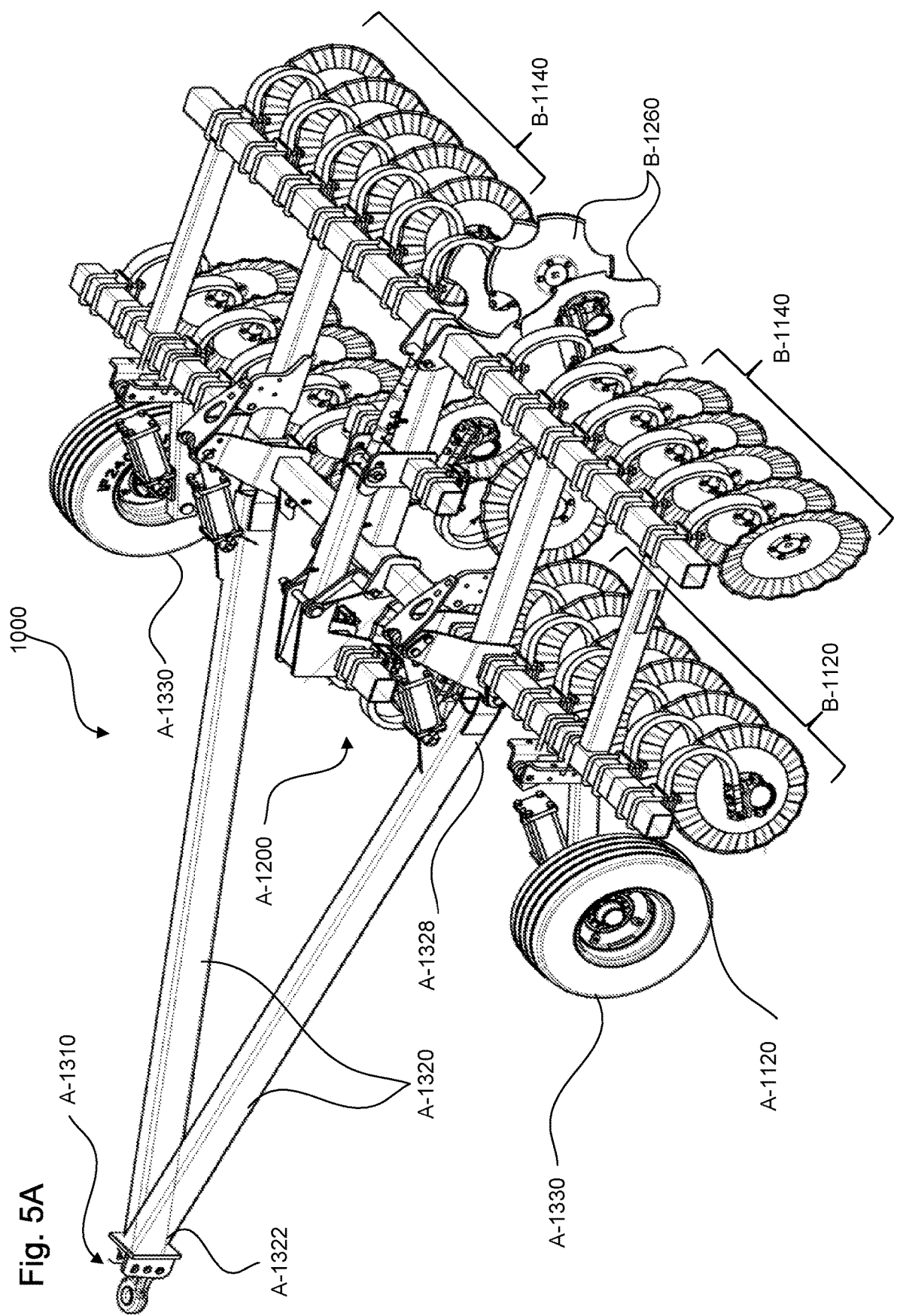
FIG. 5A is a perspective view of the disc conditioner in an independent tillage tool configuration, according to certain aspects of the disclosure.
Figure 5B:
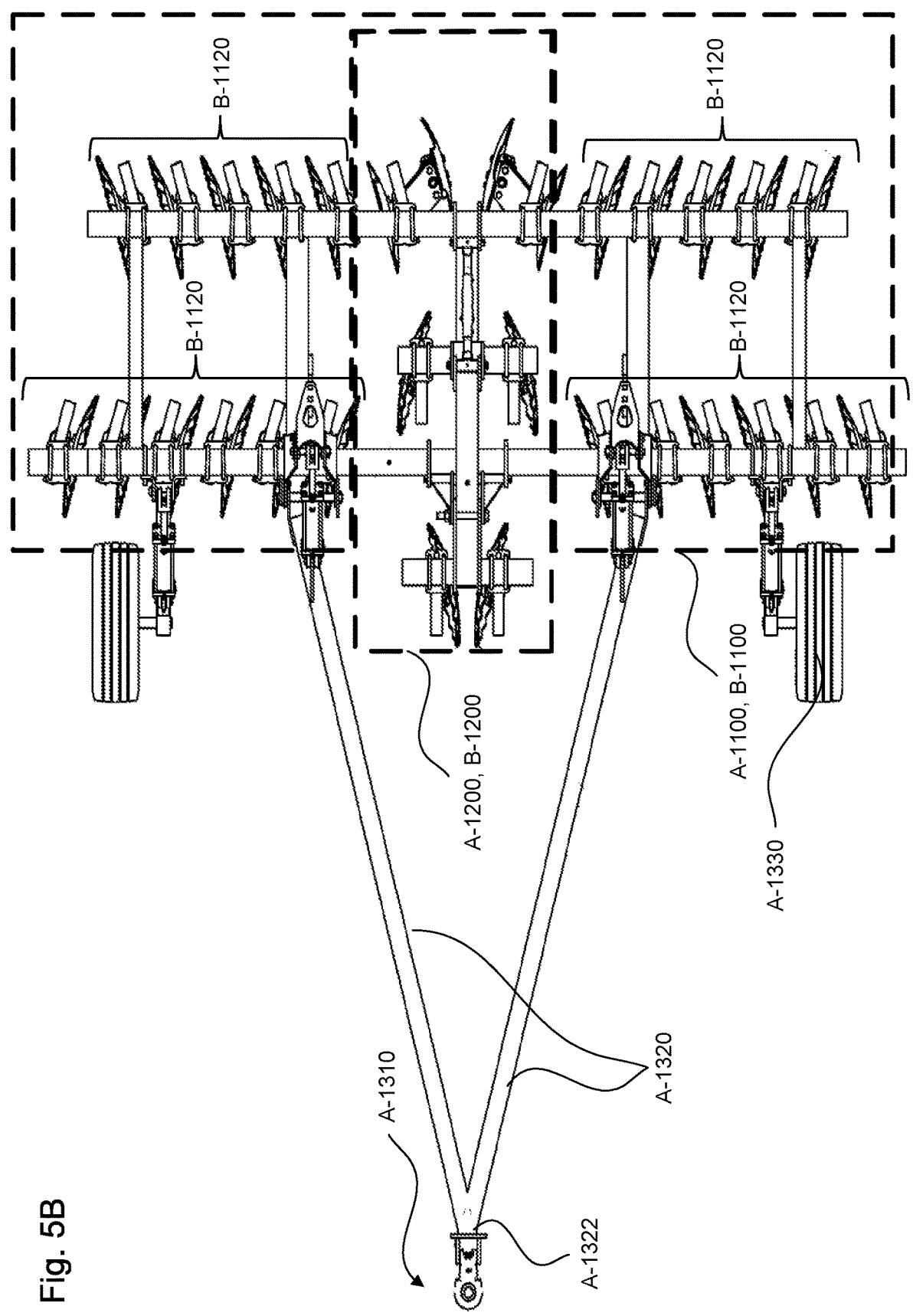
FIG. 5B is a top view of the disc conditioner in the independent tillage tool configuration, according to certain aspects of the disclosure.
Figure 5C:
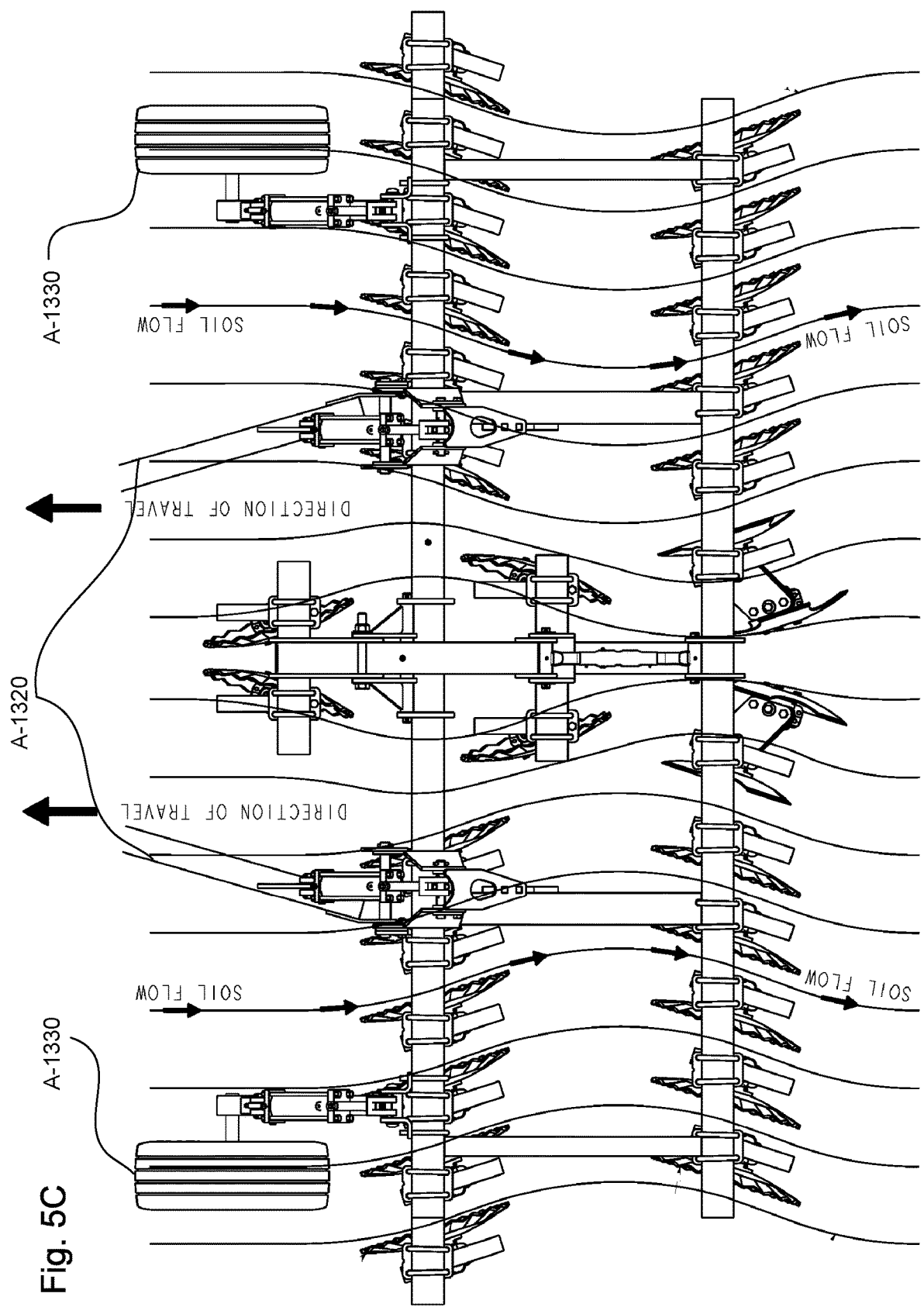
FIG. 5C is top focus view of the disc conditioner in the independent tillage tool configuration, according to certain aspects of the disclosure.

In another example, the discs of the main front disc assembly B-1120 can be arranged one-by-one along the main front member A-1120 while the discs of the main back disc assembly B-1140 can be arranged one-by-one along the main back member A-1140 when the disc conditioner 1000 is used as an independent tool, as illustrated in FIGS. 5A-5C.

Such an arrangement facilitates the flow of materials 100 from the main front disc assembly B-1120 to the main back disc assembly B-1140 by minimizing drag generated by interactions between the materials 100 and each disc of the disc assembly B-1000 due to a convex shape of the each disc. In addition, such an arrangement provides an increase in durability and/or reliability notably through difficult conditions, e.g., rocky conditions.

In another example, the discs of the main front disc assembly B-1120 can be arranged two-by-two along the main front member A-1120 while the discs of the main back disc assembly B-1140 can be arranged two-by-two along the main back member A-1140.

In another example, the discs of the main front disc assembly B-1120 can be arranged one-by-one along the main front member A-1120 while the discs of the main back disc assembly B-1140 can be arranged two-by-two along the main back member A-1140.

Such an arrangement reduces manufacturing costs by requiring less support and/or mounting structures, e.g., arms. In addition, such an arrangement provides the ability to position the secondary back blade pair B-1260 backwardly from the main back disc assembly B-1140 and to minimize the generation of residues.

In another example, the secondary back support member A-1240 can be aligned with the main front member A-1120 to have secondary back disc pair B-1240 aligned with the main front disc assembly B-1120.

Figure 3:
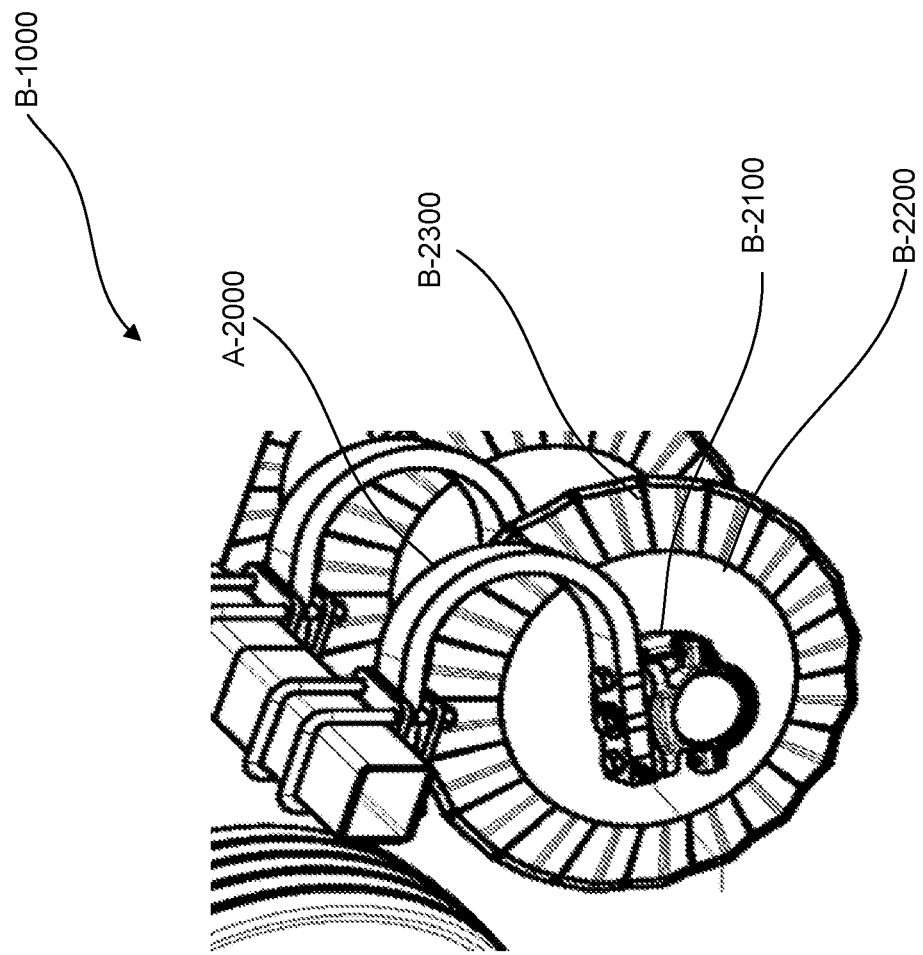
FIG. 3 is a perspective view of a disc of the disc conditioner, according to certain aspects of the disclosure.

FIG. 3 is a perspective view of the disc assembly B-1000, according to certain aspects of the disclosure.

Each disc of the disc assembly B-1000 can be supported by a shank A-2000 affixed to the support structure assembly A-1000 and include a disc central portion B-2100 supported by the shank A-2000, a disc peripheral portion B-2300, and a disc radial portion B-2200 that extends between the disc central portion B-2100 and the disc peripheral portion B-2300.

The disc peripheral portion B-2300 can have a wavy surface to further works and mix the materials 100. The disc central portion B-2100 can be affixed to a terminal portion of the shank A-2000 to provide rotation of the disc while the disc is working the materials 100. The disc radial portion B-2200 can have a conical and/or convex shape to facilitate the passage of the materials 100 around the disc.

Figure 4:
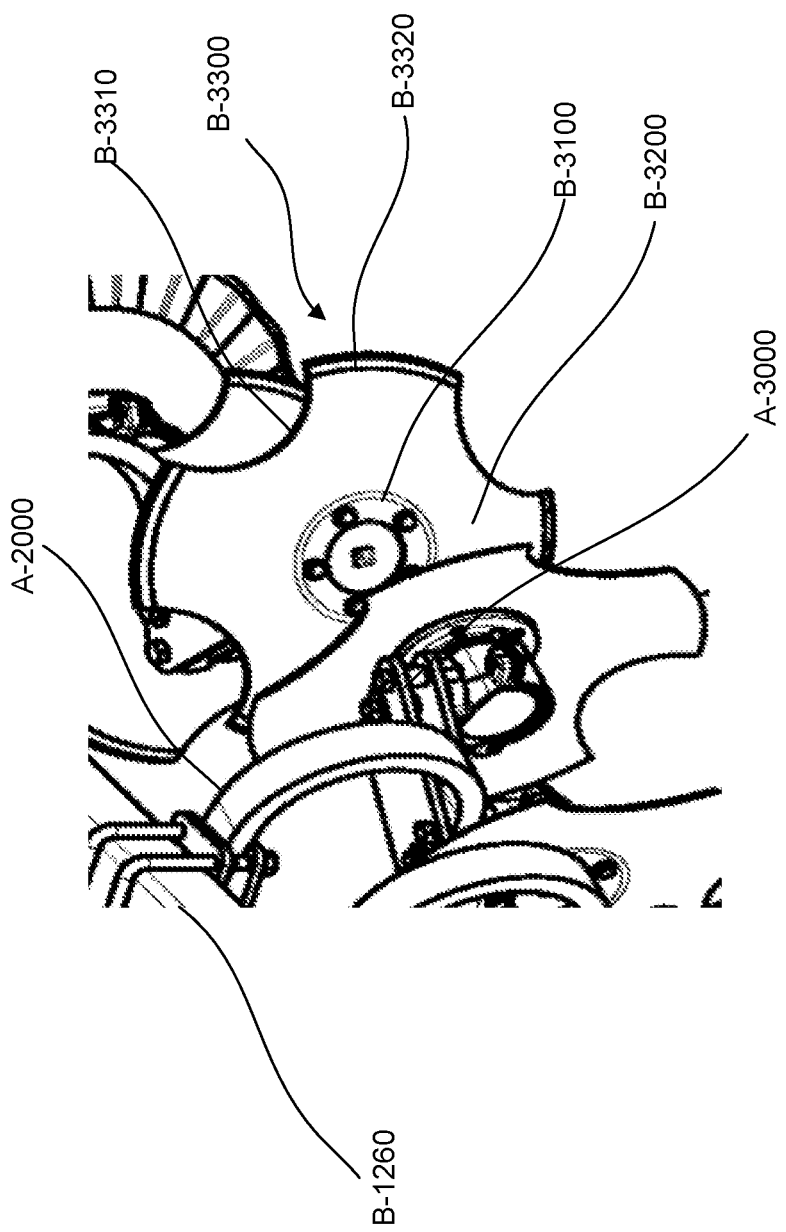
FIG. 4 is a perspective view of a blade of the disc conditioner, according to certain aspects of the disclosure.

FIG. 4 is a perspective view of a blade of the disc conditioner 1000, according to certain aspects of the disclosure.

Each front blade of the secondary front blade pair B-1280 and/or the secondary back blade pair B-1260 can be supported by a shank A-2000 affixed the main back member A-1140 and include a blade central portion B-3100 supported by the shank A-2000, a blade peripheral portion B-3300, and a blade radial portion B-3200 that extends between the blade central portion B-3100 and the blade peripheral portion B-3300.

The blade peripheral portion B-3300 can include a plurality of notches B-3310 staggered with a plurality of protrusions B-3320 with feathering cutting surfaces to works and cut the materials 100.

The blade central portion B-3100 can be affixed to a terminal portion of the shank A-2000 to provide rotation of the blade while the blade is working the materials 100. The blade radial portion B-3200 can have a conical shape to facilitate the passage of the materials 100 around the blade.

In addition, a support arm A-3000 can be placed between the blade central portion B-3100 of each back blade of the secondary back blade pair B-1260 to raise each secondary back blade B-1260 by the distance Dr, as illustrated in FIG. 2A.

FIGS. 5A-5C are a perspective view, a top view, and a focused top view of the disc conditioner 1000 in an independent tool configuration, according to certain aspects of the disclosure.

Alternatively, the disc conditioner 1000 can be configured to be used as an independent tool, e.g., attached directly to a tractor.

The disc conditioner 1000 can further include an hitch connection A-1310, a pair arms A-1320 that extends from the hitch connection A-1310 to the main front member A-1120, and a pair of wheels A-1330 supported by the main front member A-1120. Each arm of the pair of arms A-1320 can include a front arm terminal portion A-1322 affixed to the hitch connection A-1310 and a back arm terminal portion A-1328 affixed to the main front member A-1120 on each side of the secondary support structure A-1200.

The hitch connection A-1310 can provide engagement between the disc conditioner 1000 and the tractor, the pair of arms A-1320 can provide support between the tractor and the main front member A-1120, and the pair of wheels A-1330 can provide support for the disc conditioner 1000.

The secondary disc assembly B-1200, supported by the secondary support structure A-1200, is positioned offset, in the travel direction, from the main disc assembly B-1100, supported by the main support structure A-1100, to generate an oscillating flow of the materials 100 along the central stream lines Sc that fills the ditches and/or remove the ridges that may be present in the materials 100.

The secondary front disc pair B-1220 can contact the materials 100 before the main front disc assembly B-1120 and push and/or direct the materials 100 away from the center line X and towards the main front disc assembly B-1120 while the secondary back disc pair B-1240 can push and/or direct the materials 100 towards the secondary back blade pair B-1260. The secondary front blade pair B-1280 and the secondary back blade pair B-1260 can receive the materials 100 from the secondary back disc pair B-1240 and the main front disc assembly B-1120, and redirect the materials away from the central axis X to generate on the materials 100 an oscillating flow extending between the main front disc assembly B-1120 and the main back disc assembly B-1140 that reduces residues and levels the materials 100.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A disc conditioner to work soil in a forward direction, comprising:
    a main disc assembly including:
        a main front disc assembly to pushes the soil towards a central axis, and
        a main back disc assembly positioned backwardly from the main front disc assembly to push the soil away from the central axis; and
    a secondary disc assembly to level and mix the soil around the central axis, the secondary disc assembly including:
        a secondary front disc pair positioned forwardly from the main front disc assembly to push the soil away from the central axis, and
        a secondary back disc pair positioned between the main front disc assembly and the main back disc assembly to push the soil towards the central axis.

2. The disc conditioner of claim 1, wherein each secondary front disc of the secondary front disc pair is separated by a secondary front disc distance and each secondary back disc of the secondary back disc pair is separated by a secondary back disc distance longer than the secondary front disc distance.

3. The disc conditioner of claim 1, wherein the secondary front disc pair is angled towards the forward direction.

4. The disc conditioner of claim 1, wherein the secondary back disc pair is angled towards a backward direction opposite to the forward direction.

5. The disc conditioner of claim 1, further comprising a secondary back blade pair positioned backwardly from the secondary back disc pair to receive the soil from the secondary back disc pair and levels the soil.

6. The disc conditioner of claim 5, further comprising a secondary front blade pair positioned forwardly from the secondary back blade pair, the secondary back blade pair receiving the soil from the secondary front blade pair and pushing the soil outwardly from the central axis.

7. The disc conditioner of claim 6, wherein each secondary front blade of the secondary front blade pair is separated by a front blade distance and each secondary back blade of the secondary back blade pair is separated by a back blade distance smaller than the front blade pair distance.

8. The disc conditioner of claim 1, wherein the main front disc assembly includes a plurality of main front discs laterally spaced and independently mounted along a length of a main front member.

9. The disc conditioner of claim 8, wherein the main back disc assembly includes a plurality of main back discs laterally spaced and independently mounted along a length of a main back member substantially parallel to the main front member.

10. The disc conditioner of claim 9, wherein the plurality of main back discs is staggered with the plurality of main front discs.

11. The disc conditioner of claim 10, wherein the plurality of main back discs is arranged two-by-two.

12. The disc conditioner of claim 1, wherein all discs of the main front disc assembly are disposed laterally outward of all discs of the secondary disc assembly.

13. A disc conditioner to work soil in a forward direction, comprising:
    a main disc assembly; and
    a secondary disc assembly that protrudes from the main disc assembly in the forward direction, wherein the secondary disc assembly generates an oscillating soil flow along a central axis of the disc conditioner that first pushes the soil away from the central axis and then towards the central axis to reduce residues and level the soil, the secondary disc assembly includes a secondary front disc pair to push the soil away from the central axis, and a secondary back disc pair positioned backwardly from the secondary front disc pair that receives the soil from the secondary front disc pair and pushes the soil towards the central axis, and the disc conditioner further comprises a secondary back blade pair positioned backwardly from the secondary back disc pair to receive the soil from the secondary back disc pair and levels the soil.

14. The disc conditioner of claim 13, wherein each secondary front disc of the secondary front disc pair is separated by a secondary front disc distance and each secondary back disc of the secondary back disc pair is separated by a secondary back disc distance longer than the secondary front disc distance.

15. The disc conditioner of claim 13, further comprising a secondary front blade pair positioned forwardly from the secondary back blade pair, the secondary back blade pair receiving the soil from the secondary front blade pair and push the soil outwardly from the central axis.

16. The disc conditioner of claim 15, wherein each secondary front blade of the secondary front blade pair is separated by a front blade distance and each secondary back blade of the secondary back blade pair is separated by a back blade distance smaller than the front blade pair distance.

17. The disc conditioner of claim 13, wherein the main disc assembly further includes a plurality of front discs that is positioned between the secondary front disc pair and the secondary back disc pair to push the soil towards the central axis.

18. The disc conditioner of claim 17, wherein the main disc assembly further includes a plurality of back discs that is staggered with the plurality of front discs and positioned between the secondary back disc pair and the secondary back blade pair to receive the soil from the plurality of front discs and push the soil outwardly from the central axis.

* * * * *